(12) United States Patent
Hagberg et al.

(10) Patent No.: US 9,992,548 B1
(45) Date of Patent: Jun. 5, 2018

(54) AUDIO SCHEDULING AND RECORDING SYSTEMS AND METHODS

(71) Applicant: The DIRECTV Group, Inc., El Segundo, CA (US)

(72) Inventors: Hans M. Hagberg, Redondo Beach, CA (US); Vladislav Kolegayev, Los Angles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days. days.

(21) Appl. No.: 14/592,829

(22) Filed: Jan. 8, 2015

(51) Int. Cl.
| | |
|---|---|
| *H04N 21/61* | (2011.01) |
| *H04N 21/233* | (2011.01) |
| *H04N 21/426* | (2011.01) |
| *H04N 21/439* | (2011.01) |
| *H04N 21/458* | (2011.01) |
| *H04N 21/2368* | (2011.01) |
| *H04N 21/81* | (2011.01) |
| *H04N 21/2747* | (2011.01) |

(52) U.S. Cl.
CPC ....... *H04N 21/6143* (2013.01); *H04N 21/233* (2013.01); *H04N 21/2368* (2013.01); *H04N 21/2747* (2013.01); *H04N 21/4263* (2013.01); *H04N 21/439* (2013.01); *H04N 21/458* (2013.01); *H04N 21/8106* (2013.01)

(58) Field of Classification Search
CPC .. H04N 21/26283; H04N 21/02; H04N 21/04; H04N 21/6143; H04N 21/2368; H04N 21/233; H04N 21/2747; H04N 21/439; H04N 21/458; H04N 21/4263; H04N 21/8106; H04N 5/76; H04N 21/41407; H04N 21/4334; H04N 21/4345; H04N 21/47214; H04N 21/6131
See application file for complete search history.

(56) References Cited

U.S. PATENT DOCUMENTS

| | | | | |
|---|---|---|---|---|
| 5,508,733 A | * | 4/1996 | Kassatly | H04N 7/08 348/385.1 |
| 7,877,769 B2 | * | 1/2011 | Corl | H04N 5/4401 725/110 |
| 8,230,343 B2 | * | 7/2012 | Logan | G06F 17/30265 386/291 |
| 2002/0184180 A1 | * | 12/2002 | Debique | G06F 17/30038 |
| 2005/0203927 A1 | * | 9/2005 | Sull | G06F 17/30858 |

(Continued)

*Primary Examiner* — Benjamin R Bruckart
*Assistant Examiner* — Tien M Nguyen
(74) *Attorney, Agent, or Firm* — Harness, Dickey & Pierce, PLC

(57) ABSTRACT

A content distribution system generates first metadata for an audio stream, generates second metadata indicative of audio content to be included in the audio stream within a predetermined period in the future relative to present time, generates an output stream including the audio stream, the first metadata, and the second metadata, and broadcasts the output stream to user devices. A user device receives the output stream, determines the audio content to be included within the predetermined period in the future based on the second metadata, determines when target pieces of audio content are scheduled to be included in the output stream during the predetermined period in the future, tunes to the output stream when the target pieces of audio are included in the output stream, and stores the target pieces of audio in memory of the user device.

20 Claims, 7 Drawing Sheets

(56) References Cited

U.S. PATENT DOCUMENTS

| | | | |
|---|---|---|---|
| 2007/0025692 A1* | 2/2007 | Choi | H04N 5/76 386/297 |
| 2008/0148313 A1* | 6/2008 | Ozawa | H04N 5/44543 725/39 |
| 2010/0153445 A1* | 6/2010 | Bi | G06Q 10/1093 707/770 |
| 2015/0301692 A1* | 10/2015 | Patsiokas | H04N 5/76 715/716 |

* cited by examiner

AUDIO SCHEDULING AND RECORDING SYSTEMS AND METHODS

TECHNICAL FIELD

The present disclosure relates generally satellite communication and more particularly to systems and methods for scheduling, communicating, and recording audio via a satellite system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

SUMMARY

In a feature, an audio distribution and recording method includes: generating first metadata for an audio stream; generating second metadata indicative of audio content to be included in the audio stream within a predetermined period in the future relative to present time; generating an output stream including the audio stream, the first metadata, and the second metadata; and broadcasting the output stream to user devices. The method further includes, using a user device: receiving the output stream; determining the audio content to be included within the predetermined period in the future based on the second metadata; determining when target pieces of audio content are scheduled to be included in the output stream during the predetermined period in the future; tuning to the output stream when the target pieces of audio are included in the output stream; and storing the target pieces of audio in memory of the user device.

In further features, the method further includes, using the user device: tuning a tuner to the output stream when the target pieces of audio content are included in the output stream; and releasing the tuner when the target pieces of audio content are not included in the output stream.

In further features, the method further includes multiplexing, using a multiplexer, the audio stream and the first metadata with the second metadata to form the output stream.

In further features, the method further includes determining the target pieces of audio content to store based on user input.

In further features, the first and second metadata of a piece of audio content includes: a title of the piece of audio content; a name of an album including the piece of audio content; a music label; a duration of the piece of audio content; a name of an artist of the piece of audio content; a genre of the piece of audio content; a release year of the piece of audio content; and a broadcast start time.

In further features, the first and second metadata of a piece of audio content includes: title; duration; original broadcast date; and broadcast start time.

In further features, the method further includes generating a set of target pieces of audio content to store based on user input and comparing the audio content to be included within the predetermined period in the future with the set of target pieces of audio content to store.

In further features, the method further includes, in response to user input while the user device is tuned to the output stream, determining present audio content in the output stream based on the first metadata.

In further features, the method further includes broadcasting the output stream to user devices using a satellite system.

In further features, the method further includes, using the user device, selectively tuning to the output stream based on user input and outputting audio and video of the output stream via a television.

In a feature, an audio distribution and recording system is disclosed. A content distribution system generates first metadata for an audio stream, generates second metadata indicative of audio content to be included in the audio stream within a predetermined period in the future relative to present time, generates an output stream including the audio stream, the first metadata, and the second metadata, and broadcasts the output stream to user devices. A user device receives the output stream, determines the audio content to be included within the predetermined period in the future based on the second metadata, determines when target pieces of audio content are scheduled to be included in the output stream during the predetermined period in the future, tunes to the output stream when the target pieces of audio are included in the output stream, and stores the target pieces of audio in memory of the user device.

In further features, the user device tunes a tuner to the output stream when the target pieces of audio content are included in the output stream and that releases the tuner when the target pieces of audio content are not included in the output stream.

In further features, the content distribution system includes a multiplexer that multiplexes the audio stream and the first metadata with the second metadata to form the output stream.

In further features, the user device determines the target pieces of audio content to store based on user input.

In further features, the first and second metadata of a piece of audio content includes: a title of the piece of audio content; a name of an album including the piece of audio content; a music label; a duration of the piece of audio content; a name of an artist of the piece of audio content; a genre of the piece of audio content; a release year of the piece of audio content; and a broadcast start time.

In further features, the first and second metadata of a piece of audio content includes: title; duration; original broadcast date; and broadcast start time.

In further features, the user device generates a set of target pieces of audio content to store based on user input and compares the audio content to be included within the predetermined period in the future with the set of target pieces of audio content to store.

In further features, in response to user input while the user device is tuned to the output stream, determines present audio content in the output stream based on the first metadata.

In further features, the content distribution system broadcasts the output stream to user devices using a satellite system.

In further features, the user device selectively tunes to the output stream based on user input and outputs audio and video of the output stream via a television.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
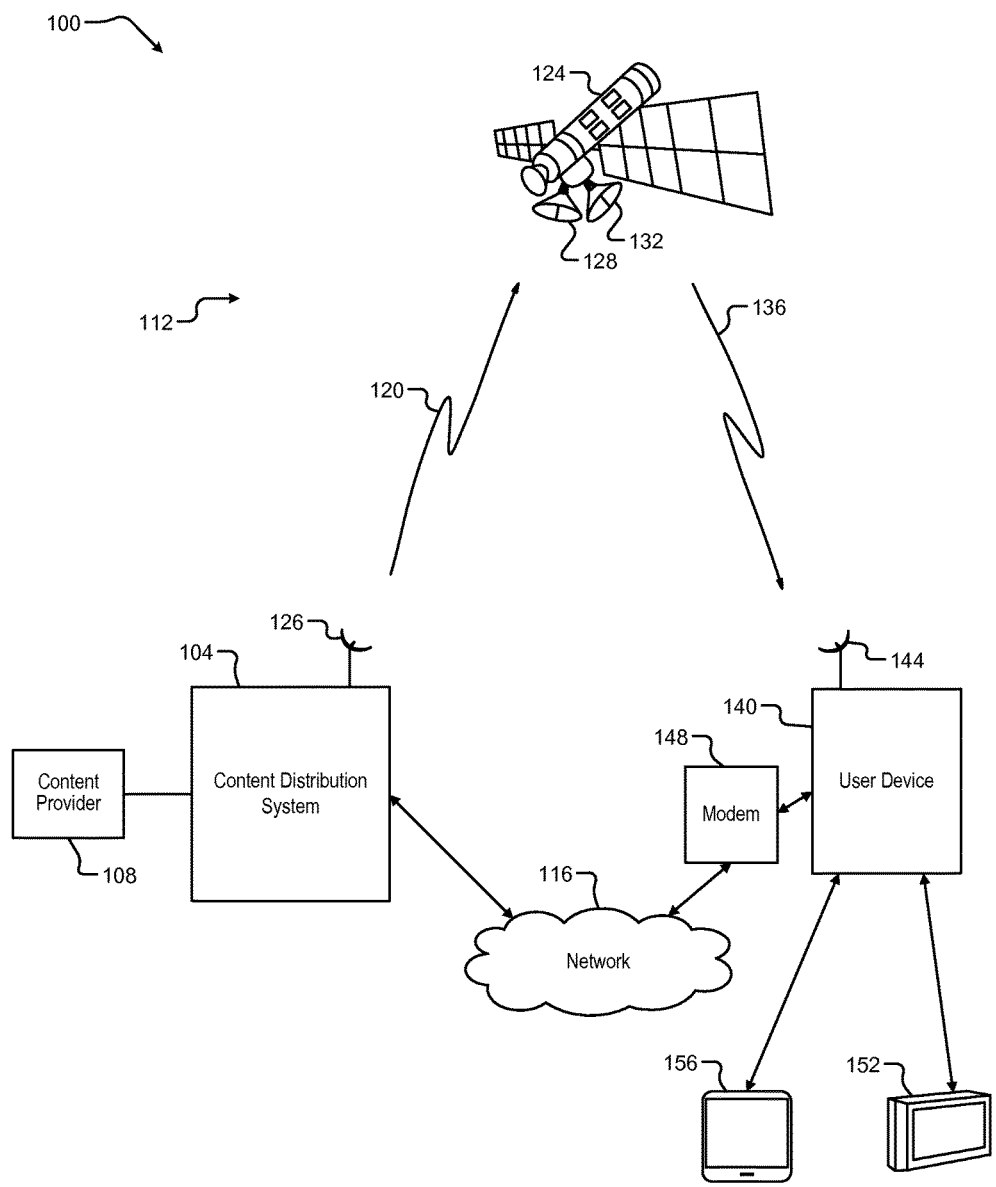
FIG. 1 is a high level functional block diagram of an example satellite distribution system.

The following description is merely exemplary in nature and is not intended to limit the present disclosure, application, or uses. For purposes of clarity, the same reference numbers will be used in the drawings to identify similar elements. It should be understood that steps within a method may be executed in different order without altering the principles of the present disclosure.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc. However, it will be readily apparent to persons of ordinary skill in the art that these terms are substantially equivalent in reference to the example systems and/or methods disclosed herein.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a functional block diagram of an example satellite distribution system 100 is illustrated. A content distribution system 104 receives content from a plurality of content providers, such as content provider 108. The content distribution system 104 communicates content and other data to users via one or more communication networks, such as a content delivery system 112 and/or a network 116, such as an Internet Protocol (IP) network. While the content delivery system 112 is shown and will be described as being a satellite content delivery system, the content delivery system 112 may be another suitable type of content delivery system, such as, but not limited to, a wired content delivery system, a wireless content delivery system, a cable content delivery system, and/or a high frequency content delivery system.

Carrying through with the satellite content delivery system example, the content distribution system 104 generates uplink signals 120 and communicates the uplink signals 120 to one or more satellites, such as satellite 124. The content distribution system 104 communicates the uplink signals 120 to the satellite(s) via an antenna 126.

The satellite 124 includes a receiving antenna 128 and a transmitting antenna 132. The satellite 124 receives the uplink signals 120 via the receiving antenna 128. The satellite 124 generates downlink signals 136 based on the uplink signals 120 and transmits the downlink signals 136 to a plurality of user devices, such as user device 140. For example, the satellite 124 may transmit the downlink signals 136 over a geographical area for reception by user devices located within that geographical area. The satellite 124 transmits the downlink signals 136 via the transmitting antenna 132.

The user device 140 may include, for example, a set-top box, a digital video recorder (DVR), a network gateway, a combination set-top box/DVR/network gateway, or another suitable type of user device. The user device 140 may be used in a fixed setting, such as in a building. Additionally or alternatively, the user device 140 may be used in a mobile setting, such as in a vehicle (e.g., plane, train, boat, automobile, etc.).

The user device 140 receives the downlink signals 136 via an antenna 144. The antenna 144 may be fixed in a single direction (e.g., when used in a fixed setting) or may be a tracking antenna in various implementations (e.g., when used in a mobile setting). One or more cables for communicating audio/visual (A/V) signals may be connected between the antenna 144 and the user device 140.

The user device 140 may also receive A/V data via the network 116, such as from the content distribution system 104 and/or one or more other data sources that can be accessed via the network 116. The user device 140 may communicate via the network 116 via one or more networking devices, such as a modem 148, a router, and/or a telephone (not shown). The user device 140 may also receive A/V signals via one or more radio frequency (RF) antennas (not shown).

The user device 140 generates A/V signals based on received signals and transmits A/V signals to one or more output devices, such as television/display 152. The user device 140 may store A/V data in a computer-readable medium (e.g., within the user device 140), for example, for output via the television 152 at a later time as commanded by a user.

The user device 140 wirelessly communicates with one or more mobile devices, such as mobile device 156. Examples of mobile devices include, but are not limited to, personal media devices, cellular phones, tablet computers, personal computers, and other types of electronic devices. For example, the user device 140 may communicate wirelessly with the mobile device 156 using an IEEE 802.11 wireless communication standard, a Bluetooth communication standard, a Zigbee communication standard, and/or one or more other suitable wireless communication standards.

Figure 2:
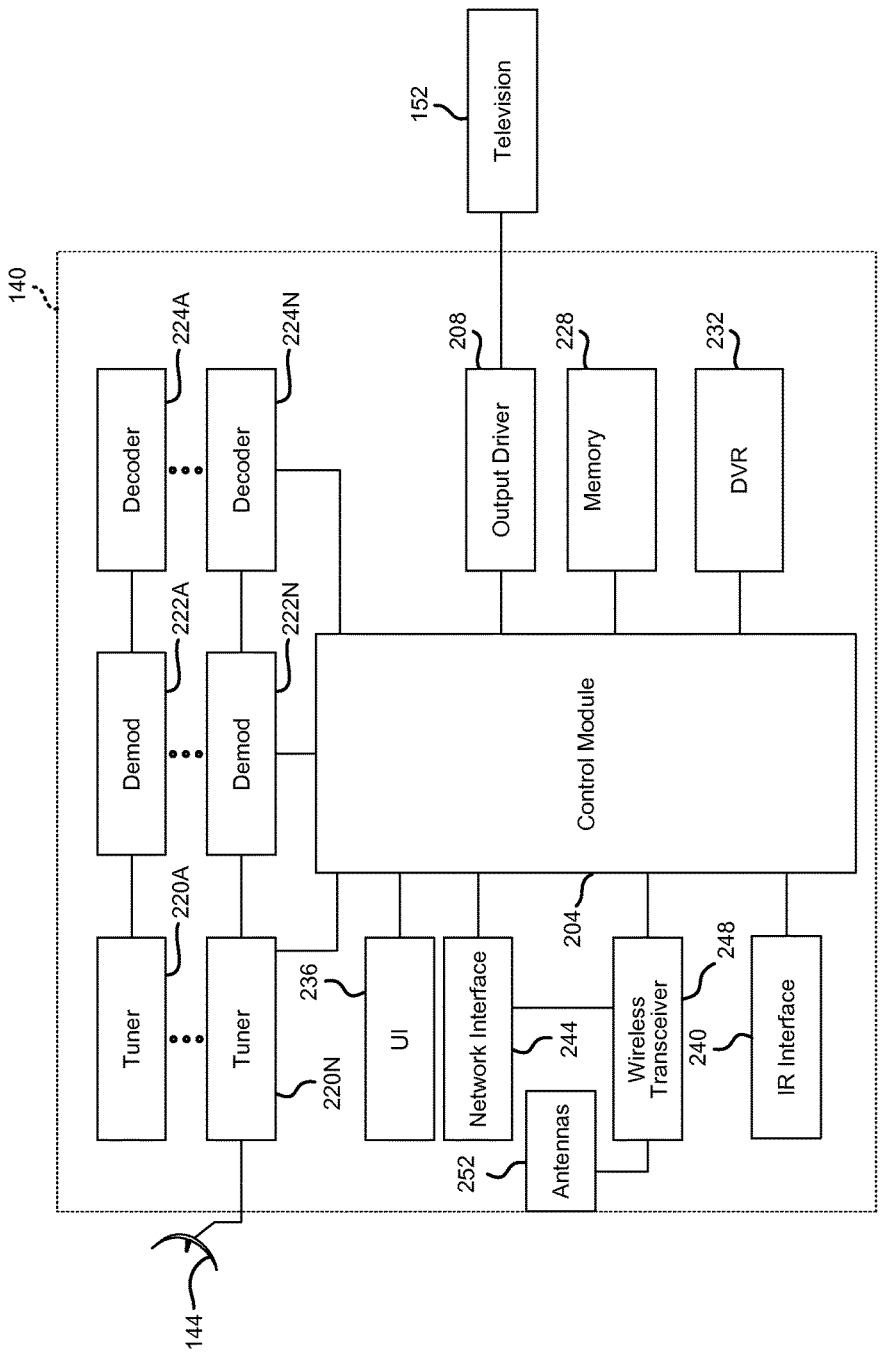
FIG. 2 is a functional block diagram of an example user device.

Referring now to FIG. 2, a functional block diagram of an example implementation of the user device 140 is presented. Although, a particular configuration of the user device 140 is shown and will be discussed, it is merely representative of various electronic devices with an internal control module used as a content receiving device.

The antenna 144 may be one of a number of different types of antennas that may include one or more low noise blocks associated therewith. The antenna 144 may be a single antenna used for satellite television reception. Of course, multiple antennas for different orbital slots may be used. In a cable system no antenna may be used. Rather, a connector to a cable may be used. The user device 140, as described above, is coupled (e.g., by cable) to a television/display, such as the television 152. A control module 204 controls an output driver 208 to control what is output (audibly and visibly) from the television 152.

The control module 204 coordinates and controls various functions of the user device 140. These functions may include, for example, tuning performed by one or more tuners 220A-220N ("tuners 220"), demodulation performed by one or more demodulator 222A-222N ("demodulators 222"), decoding performed by one or more decoders 224A-224N ("decoders 224"), buffering, and/or one or more other functions.

The tuners 220 receive A/V content transmitted on multiple different channels. The tuners 220 tune to individual channels based on signals from the control module 204 and output signals corresponding to the tuned channel. The control module 204 controls the tuners 220 based on, for example, user input. The demodulators 222 demodulate the outputs of the tuners 220. The decoders 224 decode signals output by the demodulators 222. By providing a number of tuners, demodulators, and decoders, a multiple different A/V content streams may be used by the user device 140 at a given time. For example, A/V content on one stream can be output to the television 152 while concurrently audio and/or video content on another channel can be recorded.

The control module 204 is in communication with memory 228. The memory 228 is illustrated as a single component. However, the memory 228 may include a one or more different types of memory including a hard drive, a flash drive, and/or one or more other types and/or storage devices.

The memory 228 may include storage for various operational data collected during operation of the user device 140. For example, scheduled recording data corresponding to scheduled recording events may be stored. Conflict data and conflict resolution data may also be stored. The memory 228 may store various types of data including set top box playlist data that has the playlist for content saved within the memory 228. Another type of data stored in the memory 228 is favorite settings for the user device 140. Another type of data in the memory 228 may include user profile data, channels subscription data, blocked channels, rating limits set for the user device 140, current set top box language, prioritizer data, TV resolution data, to do list data, time zone data, time of day daylight savings, status data, aspect ratio data, viewing hours data, quick tune list, a zip code, and/or other data.

The user device 140 may include a digital video recorder 232. The digital video recorder 232 may, based on user requests to store TV content, store that TV content in the memory 228. As discussed further below, the user device 140 also includes an audio recorder that stores songs in the memory 228.

The user device 140 may also include a user interface 236. The user interface 236 may include various types of user interfaces such as a keyboard, push buttons, a touch screen, a voice activated interface, etc. A user may interact with the user interface 236, for example, to change channels, to power ON and OFF, to adjust audio volume, to change the display appearance, and/or to perform other functions.

The user device 140 also includes an infrared (IR) interface 240 for communicating with a remote control device. The control module 204, for example, changes channels, adjusts audio volume, displays an EPG, and performs other functions based on commands received from the remote control device. While the example of an IR interface and a remote control device are provided, another suitable type of wireless communication interface and/or another suitable type of wireless device may be used. The user device 140 also includes a network interface 244 to communicate via the network 116.

The user device 140 includes a wireless transceiver 248 and a plurality of antennas 252. The transceiver 248 may wirelessly transmit data via a transmit antenna and may wirelessly receive data via a receive antenna. The wireless transceiver 248 may communicate wirelessly with the mobile device 156 using an IEEE 802.11 wireless communication standard, a Bluetooth communication standard, a Zigbee communication standard, and/or one or more other suitable wireless communication standards.

Figure 3:
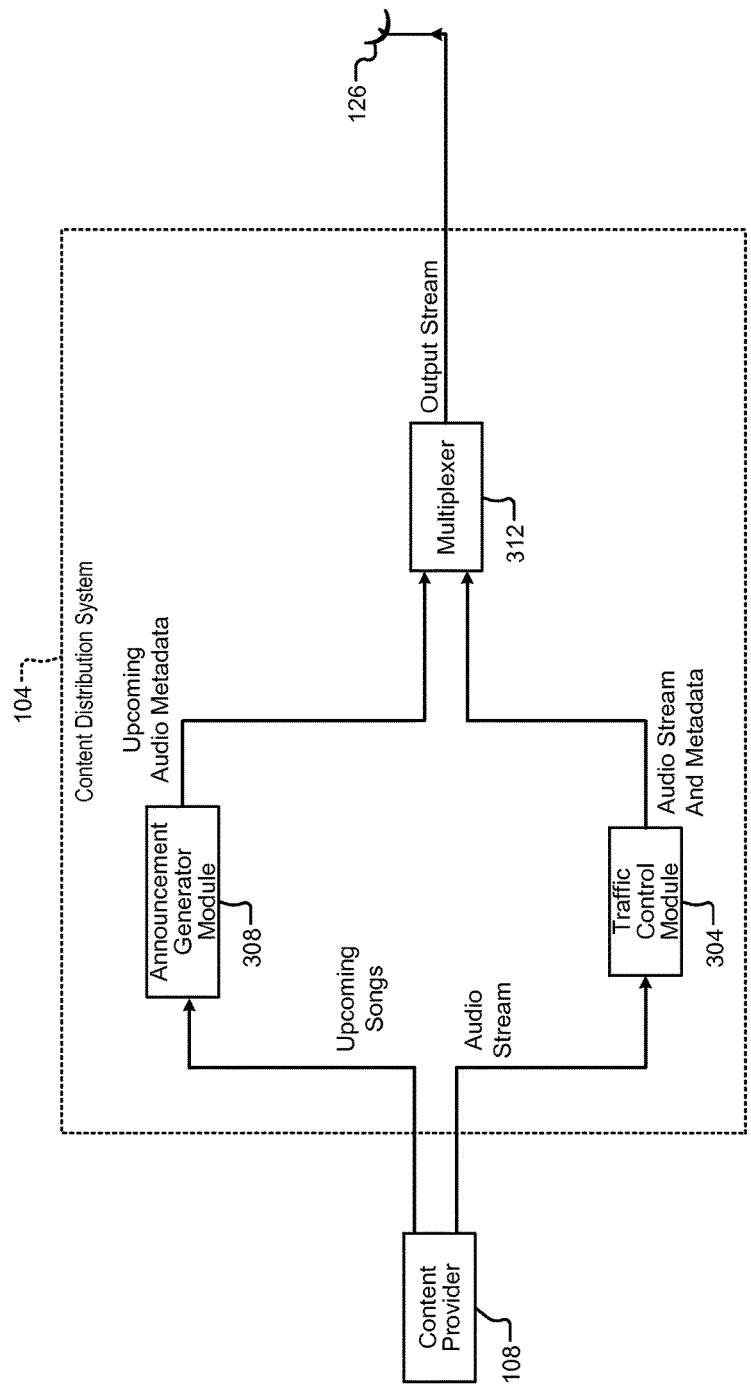
FIG. 3 is a functional block diagram of an example portion of a content distribution system.
Figure 5:
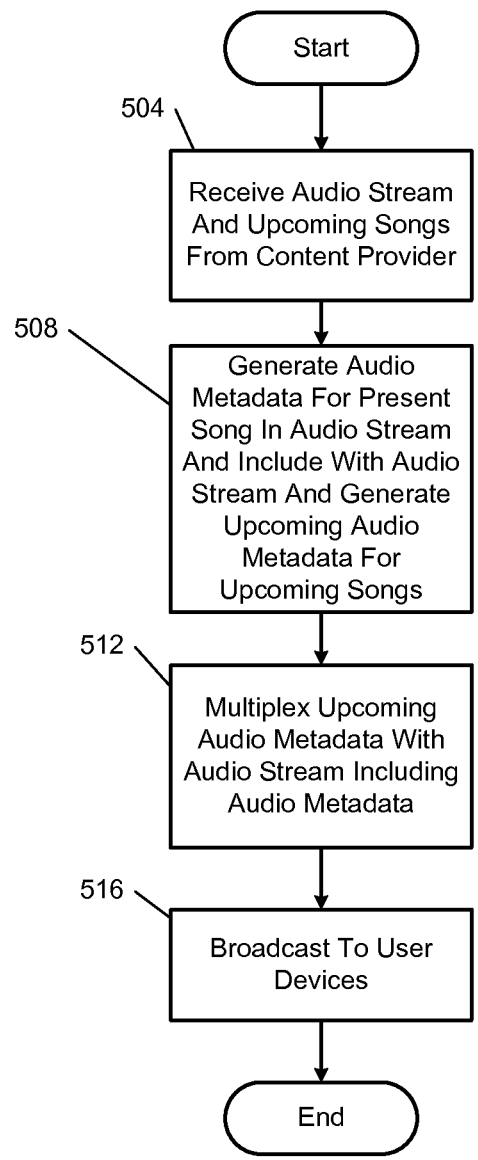
FIG. 5 is a flowchart depicting an example method of generating an output stream of audio, audio metadata, and upcoming audio metadata.

FIG. 3 includes a functional block diagram of an example portion of the content distribution system 104. FIG. 5 includes a flowchart depicting an example method of generating an output stream of audio, audio metadata, and upcoming audio metadata for audio to be broadcast during a predetermined period in the future.

The content provider 108 provides an audio stream to be broadcast on a channel. At 504 (FIG. 5), a traffic control module 304 (FIG. 3) receives the audio stream. At 508, the traffic control module 304 generates audio metadata for each song in the audio stream. While the following will be discussed in terms of songs for ease of discussion, the following is also applicable to other types of audio content communicated in an audio stream.

The audio metadata for a song is communicated with the song so the metadata is available with the song when the song is broadcast and later received. For example only, the audio metadata for a song may include, at least: a title of the song; a name of an album including the song; a music label; a duration of the song; a name of an artist of the song; a musical genre of the song; a release year of the song; and a broadcast start time. Audio metadata for other types of audio content may include, for example: title; duration; original broadcast date; and broadcast start time.

The content provider 108 also indicates upcoming songs that will be broadcast in the audio stream during a predetermined period in the future from the present time. At 504 (FIG. 5), an announcement generator module 308 (FIG. 3) receives the upcoming songs. At 508, the announcement generator module 308 generates upcoming audio metadata for each of the upcoming songs to announce that the upcoming songs will be broadcast in the near future in the audio stream. The upcoming audio metadata may include at least the same types of data as included in the audio metadata.

At 512 (FIG. 5), a multiplexer 312 (FIG. 3) multiplexes the audio stream and its audio metadata with the upcoming audio metadata to produce an output stream that is broadcast to user devices, such as the user device 140. The output stream therefore includes the audio stream, the audio metadata for the present song in the audio stream, and the upcoming audio metadata for songs that will be included in the output stream within the predetermined period from the present time. While only a single content provider and a single audio stream is shown and discussed in conjunction with the example of FIG. 3, a video stream may also be communicated with the audio stream. Multiple other output streams are also communicated and may be provided by one or more other content providers. At 516, the content distribution system 104 broadcasts the output stream to user devices generally via the satellite distribution system. While the example of FIG. 5 is shown and discussed as ending after 516, FIG. 5 is illustrative of one control loop and a control loop may be started every predetermined period.

Figure 4:
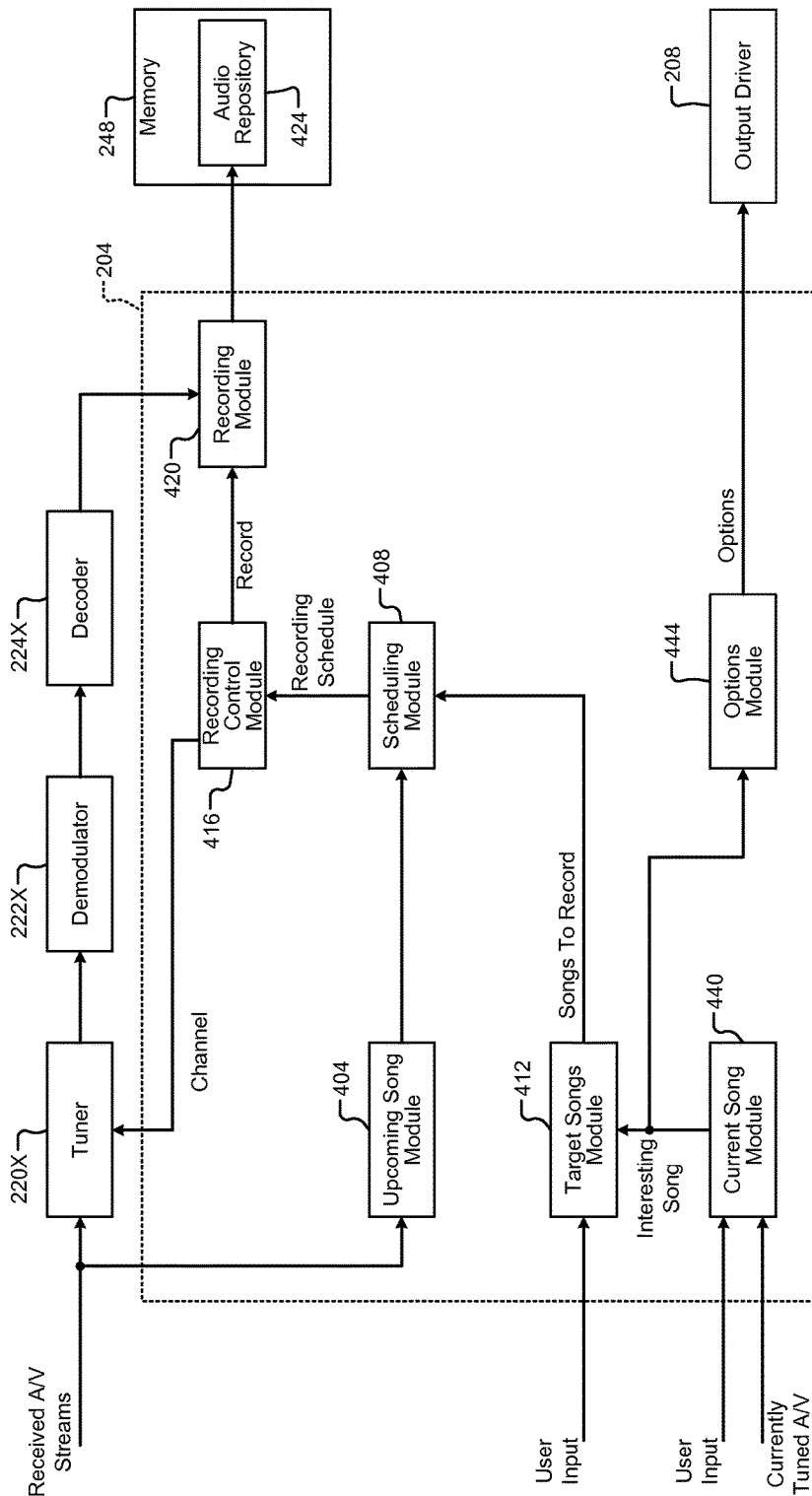
FIG. 4 is a functional block diagram of an example portion of a control module of a user device.
Figure 6:
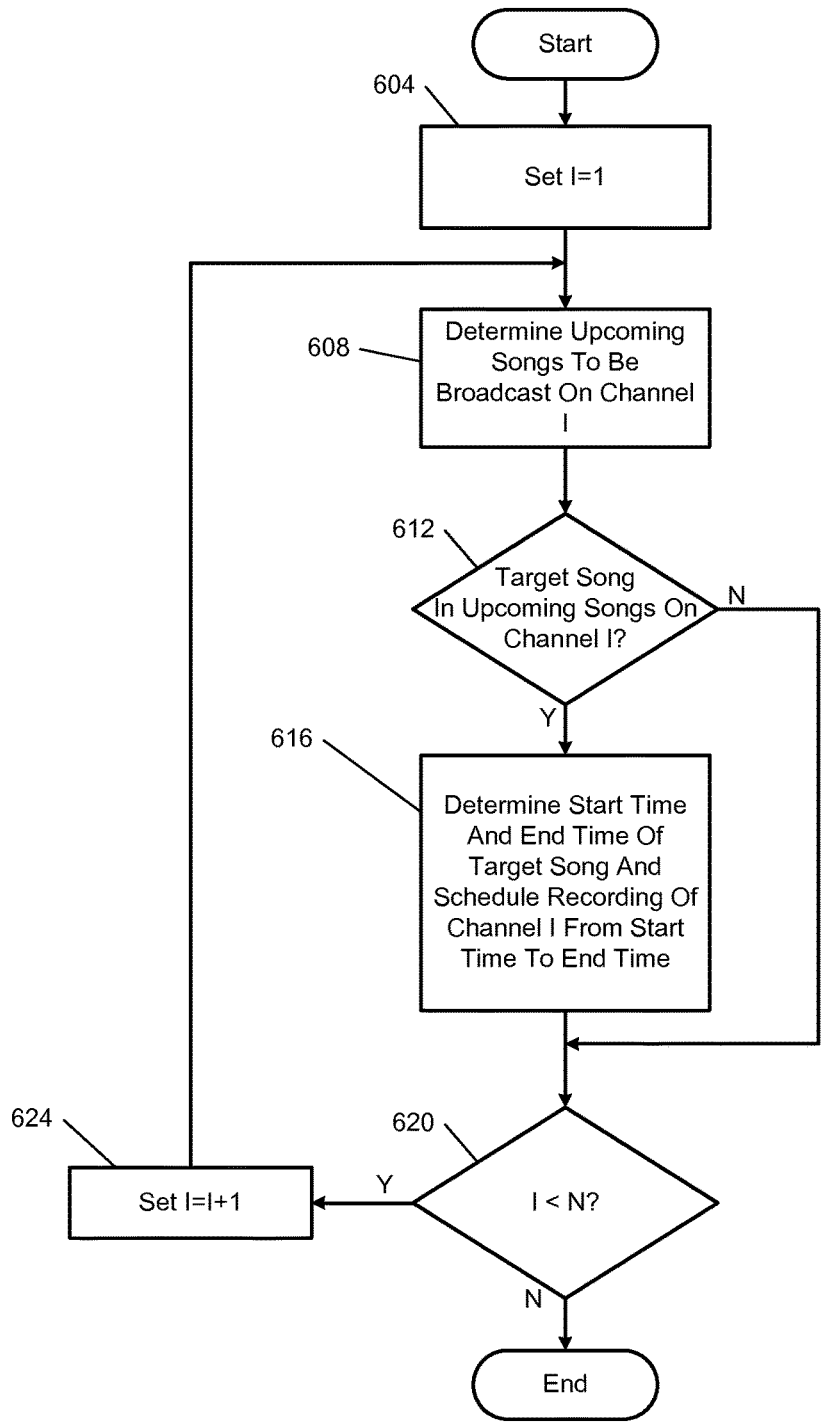
FIG. 6 is a flowchart depicting an example method of scheduling recording of upcoming songs that are scheduled to be broadcast in the future.

Referring now to FIG. 4, a functional block diagram of an example portion of the control module 204 of the user device 140 is presented. FIG. 6 includes a flowchart depicting an example method of scheduling recording of upcoming songs.

As stated above, multiple A/V streams are transmitted to the user device 140 on different channels. An upcoming song module 404 (FIG. 4) monitors the A/V streams and determines songs that will be broadcast on the channels within the predetermined period in the future.

The upcoming song module 404 determines the songs that will be broadcast using the upcoming audio metadata. For example, at 604 of FIG. 6, the upcoming song module 404 may set a counter value (I) equal to 1. At 608 of FIG. 6, the upcoming song module 404 determines the songs that will be broadcast on the I-th channel based on the upcoming audio metadata on the I-th channel.

The upcoming song module 404 provides the upcoming songs and the upcoming audio metadata for each of the upcoming songs to a scheduling module 408 (FIG. 4).

A target songs module 412 (FIG. 4) determines target songs to record and store based on user input to the user device 140. For example, the user input may indicate songs identified as being liked by the user, songs identified by the user as being favorites, songs previously downloaded and/or stored, songs in a playlist of the user, songs by an artist identified as by the user as being liked or a favorite, etc. The user device 140 may receive the user input, for example, via user input to the remote control device, user input to the mobile device 156, and/or via user input to the user interface 236 of the user device 140.

The scheduling module 408 determines whether the target songs to record are included in the upcoming songs indicated by the upcoming song module 404. In other words, the scheduling module 408 determines whether the target songs to record are scheduled to be broadcast within the predetermined period in the future. For example, at 612 of FIG. 6, the scheduling module 408 determines whether one or more of the target songs to record are scheduled to be broadcast on the I-th channel within the predetermined period. If 612 is true, control continues with 616. If 612 is false, control transfers to 620.

When a target song to record is scheduled to be broadcast within the predetermined period in the future, the scheduling module 408 determines the scheduled broadcast time of the target song to record. As stated above, the scheduled (beginning) broadcast time is included in the upcoming audio metadata for the target song to record. The determination is made for each of the target songs to record.

The scheduling module 408 generates a recording schedule when one or more of the target songs to record are scheduled to be broadcast within the predetermined period in the future, as indicated by the upcoming audio metadata. The recording schedule includes channels to be tuned to for recording ones of the target songs that are scheduled to be broadcast and starting and ending times for recording the ones of the target songs on those channels, respectively. For example, at 616 of FIG. 6, the scheduling module 408 determines the starting time and the ending time of one of the target songs that is scheduled to be recorded on the I-th channel. The scheduling module 408 also adds to the recording schedule to record channel I from at or before the starting time to at or after the ending time at 616 of FIG. 6.

At 620 of FIG. 6, the upcoming song module 404 may determine whether the counter value (I) is less than a total number of the channels (N). If 620 is false, control may end. If 620 is true, the upcoming song module 404 may increment the counter value I (e.g., set I=I+1) at 624, and control may return to 608 to determine the upcoming songs to be broadcast on the next channel. While control is shown and discussed as ending, the example of FIG. 6 is illustrative of one control loop and a control loop is started every predetermined period. This predetermined period is less than or equal to the predetermined period for the upcoming songs.

Figure 7:
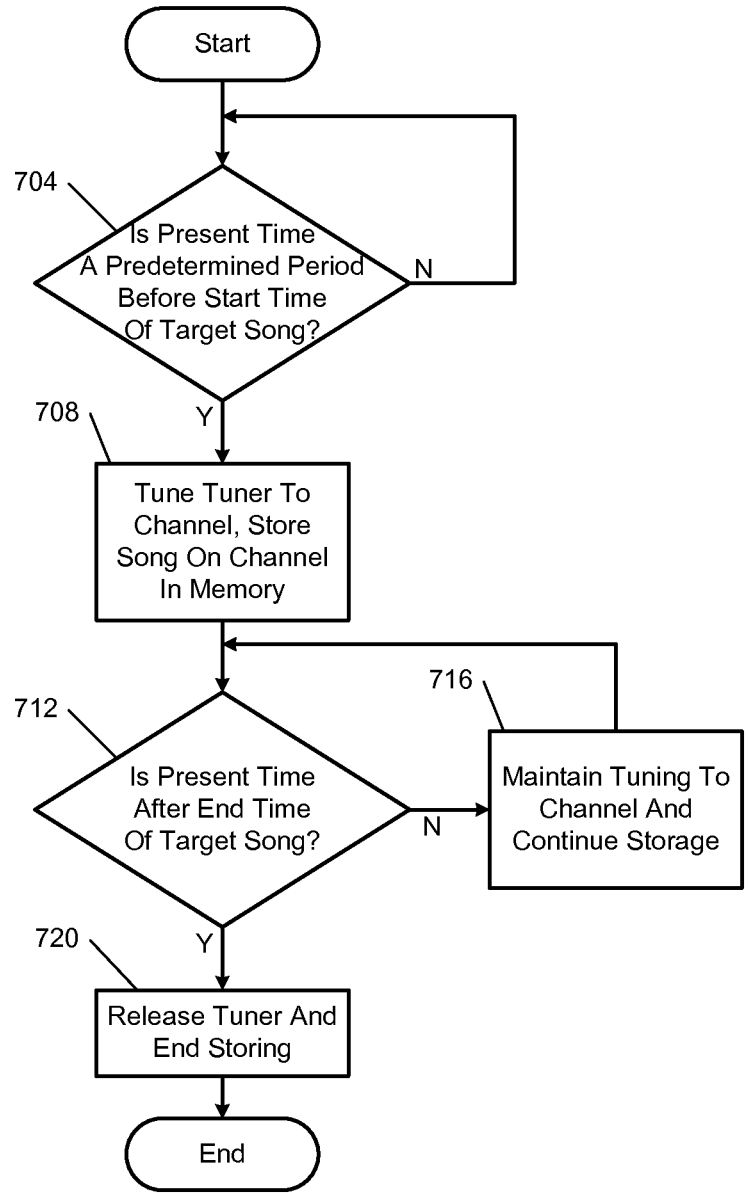
FIG. 7 is a flowchart depicting an example method of recording songs when they are scheduled to be broadcast.

FIG. 7 is a flowchart depicting an example method of recording songs when they are scheduled to be broadcast. A recording control module 416 (FIG. 4) controls tuning for and recording of the target songs when the target songs are broadcast. At or before the present time reaches a starting time of a target song to record, the recording control module 416 identifies an available one of the tuners 220 (e.g., tuner 220X in FIG. 4) and tunes that one of the tuners 220 to the channel on which the target song is to be broadcast. The recording control module 416 determines the starting time and the channel for the target song from the recording schedule. A tuner may be deemed available, for example, when the tuner is not presently tuned for recording or output to the television 152 and is not scheduled to be tuned for recording or output to the television 152 during the broadcast of that target song.

For example, at 704 of FIG. 7, the recording control module 416 determines whether the present time is at or within a predetermined period before the starting time of one of the target songs indicated in the recording schedule. If 704 is true, control continues with 708. If 704 is false, control may remain at 704. At 708 of FIG. 7, the recording control module 416 tunes an available tuner to the channel on which the one of the target songs is scheduled to be broadcast, again as indicated in the recording schedule.

The associated one of the demodulators 222 (e.g., demodulator 220X in FIG. 4) demodulates the output of the one of the tuners 220, and the associated one of the decoders 224 (e.g., decoder 224X in FIG. 4) decodes the output of the one of the demodulators 222.

The recording control module 416 also triggers a recording module 420 to record the audio stream output from the one of the decoders at or before the present time reaches the starting time of the target song to record. When triggered, the recording module 420 stores the output from the one of the decoders for the target song in an audio repository 424, such as in the memory 228. This is also indicated by 708 of FIG. 7. Once stored, the user can later prompt the user device 140 to play the song from the audio repository 424, such as using speakers of the television 152.

At 712 of FIG. 7, the recording control module 416 may determine whether the present time is at or after the ending time of the one of the target songs as indicated in the recording schedule. If 712 is false, the recording control module 716 maintains tuning to the one of the channels and the storage of the song broadcast on that channel in the audio repository 424 at 716, and control returns to 712. If 712 is true, the recording control module 416 releases the one of the tuners (i.e., makes that tuner available again) and the recording module 420 stops recording at 720. While the example of FIG. 7 is shown and discussed as ending after 720, FIG. 7 is illustrative of one control loop and may be performed for each of the target songs scheduled to be recorded in the recording schedule.

Referring back to FIG. 4, the control module 204 also includes a current song module 440. The current song module 440 receives currently A/V stream that is currently tuned using one of the tuners and that is currently being output for output from the television 152 via the output driver 208.

At any time during viewing, a user of the television 152 may indicate interest in the present song being output to the user, for example, via the remote control device. When the user indicates interest in the present song being output to the user via the television 152, the current song module 440 determines information on the present song based on the audio metadata included in the tuned A/V stream.

One or more actions may be performed based on a song identified as interesting to the user. For example, the current song module 440 may indicate the user's interest in the present song to the target songs module 412 for possible use as a target song for recording, etc.

As another example, the current song module 440 may indicate the song identified as interesting to the user to an options module 444. The options module 444 may display on the television 152 multiple options regarding the song. For example, the options module 444 may display an option to schedule the song for recordation, create a playlist including the song or add the song to an existing playlist, mark the song as a favorite song of the user, order a physical or digital copy of the album on which the song appears, and/or one or more other options. The control module 204 acts accordingly based on user selection of an option.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An audio distribution and recording system, comprising:
   a content distribution system that generates first metadata for an audio stream of a combined audio/visual signal (A/V signal), that generates second metadata indicative of a plurality of songs having a song title, artist and broadcast start time to be included in the audio stream within a predetermined period in the future relative to present time, that generates an output stream including the A/V signal, the first metadata, and the second metadata, and that broadcasts the output stream to user devices; and
   a user device that receives the output stream that, during viewing of the A/V signal of the output stream, identifying a first song of interest in the A/V signal by interacting with a user interface and obtaining information from the A/V signal and adding the first song to a set of target songs to store based on user input from the user interface, that determines audio content to be included in the audio stream of the A/V signal within the predetermined period in the future based on the second metadata, that determines when target songs are scheduled to be included in the output stream during the predetermined period in the future, that compares the second metadata with the set of target songs to store, that tunes to the output stream when the target songs are included in the output stream based on comparing the second metadata and the set of target songs, and that separates the target songs from the A/V signal and stores the target songs in an audio repository of the user device without storing the video associated with the A/V signal, the storing based on comparing the second metadata and the set of target songs.

2. The audio distribution and recording system of claim 1 wherein the user device tunes a tuner to the output stream when the target songs are included in the output stream and thereafter that releases the tuner when the target pieces of audio content are not included in the output stream.

3. The audio distribution and recording system of claim 1 wherein the content distribution system includes a multiplexer that multiplexes the audio stream and the first metadata with the second metadata to form the output stream.

4. The audio distribution and recording system of claim 1 wherein the user device determines the target songs to store based on user input.

5. The audio distribution and recording system of claim 1 wherein the second metadata of the plurality of songs includes: a name of an album for a song of the plurality of songs; a music label; a duration for the song; a name of an artist for the song; a genre for the song; and a release year for the song.

6. The audio distribution and recording system of claim 1 wherein the second metadata of a song includes: an audio content duration and original broadcast date.

7. The audio distribution and recording system of claim 1 wherein, in response to user input while the user device is tuned to the output stream, determines present songs in the output stream based on the first metadata.

8. The audio distribution and recording system of claim 1 wherein the content distribution system broadcasts the output stream to user devices using a satellite system.

9. The audio distribution and recording system of claim 1 wherein the user device selectively tunes to the output stream based on user input and outputs audio and video of the output stream via a television.

10. An audio distribution and recording method, comprising:
    generating first metadata for an audio stream of a combined audio/visual signal (A/V signal);
    generating second metadata indicative of a plurality of songs having a song title, artist and broadcast start time to be included in the audio stream within a predetermined period in the future relative to present time;
    generating an output stream including the A/V signal, the first metadata, and the second metadata;
    broadcasting the output stream to user devices; and
    using a user device:
       receiving the output stream;
       during viewing of the A/V signal of the output stream, identifying a first song of interest in the A/V signal by interacting with a user interface and obtaining information from the A/V signal;
       adding the first song to a set of target songs to store based on user input from the user interface;
       determining audio content to be included in the audio stream of the A/V signal within the predetermined period in the future based on the second metadata;
       determining when target songs are scheduled to be included in the output stream during the predetermined period in the future;
       comparing the second metadata with the set of target songs to store;
       tuning to the output stream when the target songs are included in the output stream when the target songs are included in the output stream based on comparing the second metadata and the set of target songs; and
       separating the target songs from the A/V signal and storing the target songs in an audio repository of the user device without storing the video associated with the A/V signal, to the step of comparing based on the second metadata and the set of target songs.

11. The audio distribution and recording method of claim 10 further comprising, using the user device:
tuning a tuner to the output stream when the target songs are included in the output stream; and
thereafter, releasing the tuner when the target songs are not included in the output stream.

12. The audio distribution and recording method of claim 10 further comprising multiplexing, using a multiplexer, the audio stream and the first metadata with the second metadata to form the output stream.

13. The audio distribution and recording method of claim 10 further comprising determining the target songs to store based on user input.

14. The audio distribution and recording method of claim 10 wherein the second metadata of the plurality of songs includes: a name of an album for a song of the plurality of songs; a music label; a duration for the song; a name of an artist for the song; a genre of the song and a release year for the song.

15. The audio distribution and recording method of claim 10 wherein the first and second metadata of a piece of audio content includes: title; an audio content title; an audio content duration; original broadcast date; and broadcast start time.

16. The audio distribution and recording method of claim 10 further comprising generating a set of target pieces of audio content to store based on user input and comparing the audio content to be included within the predetermined period in the future with the set of target pieces of audio content to store.

17. The audio distribution and recording method of claim 10 further comprising, in response to user input while the user device is tuned to the output stream, determining present audio content in the output stream based on the first metadata.

18. The audio distribution and recording method of claim 10 further comprising broadcasting the output stream to user devices using a satellite system.

19. The audio distribution and recording method of claim 10 further comprising, using the user device, selectively tuning to the output stream based on user input and outputting audio and video of the output stream via a television.

20. An audio distribution and recording system comprising:
a content distribution system generating audio metadata for an audio stream of a combined audio/visual signal (A/V signal), that generates second metadata corresponding to an upcoming song to be included in the audio stream of an audio/visual signal (A/V signal) at a future time different than the audio metadata and that multiplexes the audio metadata, the second metadata and the audio stream to form an output stream, said second metadata comprising a title of the upcoming song, a name of an album including the upcoming song, a music label, a duration of the upcoming song, a name of an artist of the upcoming song, a genre of the upcoming song and a release year of the upcoming song;
a user device that receives the output stream that, during viewing of the A/V signal of the output stream, identifying a first song of interest in the A/V signal by interacting with a user interface and obtaining information from the A/V signal and adding the first song to a set of target songs to store based on user input from the user interface, that determines the upcoming song to be included in the audio stream of the A/V signal within the predetermined period in the future based on the second metadata, that determines when one or more of the set of target songs are included in the output stream during the predetermined period in the future, that compares the second metadata corresponding to the upcoming song with the set of target songs to store, that tunes to the output stream when the upcoming song corresponds to the set of target songs, and that separates the upcoming song from the A/V signal and stores, based on the second metadata, the upcoming song in the memory of the user device after tuning without storing video associated with the A/V signal.

\* \* \* \* \*